(12) United States Patent
Tsuji et al.

(10) Patent No.: US 6,464,923 B2
(45) Date of Patent: Oct. 15, 2002

(54) METHOD FOR PRODUCING MOLDED SILICONE RUBBER PRODUCT

(75) Inventors: Yuichi Tsuji; Akito Nakamura, both of Chiba Prefecture (JP)

(73) Assignee: Dow Corning Tory Silicone Co., Ltd., Tokyo (JP)

( * ) Notice: Subject to any disclaimer, the term of this patent is extended or adjusted under 35 U.S.C. 154(b) by 0 days.

(21) Appl. No.: 09/791,135

(22) Filed: Feb. 22, 2001

(65) Prior Publication Data
US 2001/0023275 A1 Sep. 20, 2001

(30) Foreign Application Priority Data
Feb. 22, 2000 (JP) ........................... 2000-044463

(51) Int. Cl.$^7$ ................................. C08J 5/00
(52) U.S. Cl. ............... 264/330; 264/328.3; 264/328.17; 264/328.16; 264/328.6; 524/588
(58) Field of Search ................ 524/588; 264/328.3, 264/328.6, 330, 328.16, 328.17

(56) References Cited
U.S. PATENT DOCUMENTS 4,842,943 A * 6/1989 Kobayashi et al. ......... 428/447

* cited by examiner

Primary Examiner—Margaret G. Moore
(74) Attorney, Agent, or Firm—Jennifer S. Warren; Jim L. De Cesare

(57) ABSTRACT

A method for producing a molded silicone rubber product comprising
(i) forming a mixture comprising
  (A) a primary composition in the form of a paste comprising an inorganic filler and a diorganopolysiloxane containing at least 2 silicon atom-bonded alkenyl groups per molecule,
  (B) a liquid catalyst composition comprising a platinum catalyst and an organopolysiloxane containing at least 2 silicon atom-bonded alkenyl groups per molecule, and
  (C) a liquid curing composition comprising an organopolysiloxane having at least 2 silicon atom-bonded hydrogen atoms per molecule and an organopolysiloxane having at least 2 silicon atom-bonded alkenyl groups per molecule;
(ii) feeding the mixture comprising components (A), (B), and (C) into a molding device; and
(iii) curing the mixture comprising components (A), (B), and (C) by heating.

4 Claims, 1 Drawing Sheet

METHOD FOR PRODUCING MOLDED SILICONE RUBBER PRODUCT

FIELD OF THE INVENTION

The present invention relates to a method for producing a molded silicone rubber product.

BACKGROUND OF THE INVENTION

Compositions that comprise organohydrogenpolysiloxanes and organopolysiloxanes containing silicon atom-bonded alkenyl groups in the form of liquids, and that are formed into silicone rubber when cured in the presence of a platinum catalyst (addition reaction-curable liquid silicone rubber compositions), are used in an extremely broad range of fields to form gaskets, packing, and seals for industrial instruments and automobiles; as well as copier, fax, and printer rolls; and key pads for electronic calculators, cellular telephones, and various keyboards.

A typical method for producing molded silicone rubber products from such liquid addition reaction-curable silicone rubber compositions is to prepare two separate liquids comprising a primary agent (liquid A) containing a platinum catalyst and an organopolysiloxane containing silicon atom-bonded alkenyl groups, and a curing agent (liquid B) containing an organohydrogenpolysiloxane and an organopolysiloxane containing silicon atom-bonded alkenyl groups. The liquid A and liquid B are stored separately and mixed to form a silicone rubber-forming composition immediately before feeding the composition into a silicone rubber-molding device where the composition is heated and cured so as to produce a molded silicone rubber product.

Various inorganic fillers are frequently blended with such liquid addition reaction-curable silicone rubber compositions in order to improve the mechanical strength and heat resistance, to provide the silicone rubber with conductivity and flame retardance, and so forth. However, a common problem with liquid addition reaction-curable silicone rubber compositions containing such inorganic fillers is the poor storage stability, despite the separate storage of the two liquids described above. When these are stored for long periods of time, it is not always possible to preserve the curing properties after manufacture or the physical properties after curing. For example, when liquid addition reaction-curable silicone rubber compositions containing carbon black are stored in the form of the two separate liquids described above, the platinum catalyst activity is lost as a result of active groups on the surface of the carbon black, the adsorption capacity of the carbon black, impurities contained in the carbon black, and so forth, while the organohydrogenpolysiloxane can deteriorate as a result of condensation reaction. The liquid addition reaction-curable silicone rubber composition does not cured very rapidly, despite the division into two liquids, resulting in a cured silicone rubber that is not as hard as it should be.

Additionally, the amount of the curing agent and the amount of catalyst in the primary component cannot be independently altered when producing a molded silicone rubber product from the liquid addition reaction-curable silicone rubber composition thus divided into two types of liquids. That is, when the curing rate of the liquid addition reaction-curable silicone rubber composition or the degree of hardness of the cured silicone rubber is to be modified, however slightly, the primary component and curing agent must be entirely replaced and prepared anew, considerably compromising productivity.

The present inventors have found that the storage stability of the platinum catalyst and the curing agent can be improved, and that the period for which a silicon rubber-forming composition may be stored can thus be prolonged when a liquid addition reaction-curable silicone rubber composition is stored in the form of separate components comprising a paste primary composition comprising an inorganic filler and an organopolysiloxane containing at least 2 silicon atom-bonded alkenyl groups per molecule, a liquid catalyst composition comprising a platinum catalyst and an organopolysiloxane having at least 2 silicon atom-bonded alkenyl groups per molecule, and a curing composition comprising an organopolysiloxane with at least 2 silicon atom-bonded hydrogen atoms per molecule and an organopolysiloxane with at least 2 silicon atom-bonded alkenyl groups per molecule. The 3 liquids are mixed to produce a silicone rubber-forming composition when manufacturing a molded silicone rubber product and the composition is heated and cured to produce a molded silicone rubber product. The inventors furthermore found that such a method allows the curing rate of the liquid addition reaction-curable silicone rubber composition to be adjusted and the hardness to be adjusted, which cannot be done in conventional methods.

SUMMARY OF THE INVENTION

A method for producing a molded silicone rubber product comprising
(i) forming a mixture comprising
 (A) a primary composition in the form of a paste comprising an inorganic filler and a diorganopolysiloxane containing at least 2 silicon atom-bonded alkenyl groups per molecule,
 (B) a liquid catalyst composition comprising a platinum catalyst and an organopolysiloxane containing at least 2 silicon atom-bonded alkenyl groups per molecule, and
 (C) a liquid curing composition comprising an organopolysiloxane having at least 2 silicon atom-bonded hydrogen atoms per molecule and an organopolysiloxane having at least 2 silicon atom-bonded alkenyl groups per molecule;
(ii) feeding the mixture comprising components (A), (B), and (C) into a molding device, and
(iii) curing the mixture comprising components (A), (B), and (C) by heating.

DESCRIPTION OF THE INVENTION

Figure 1:
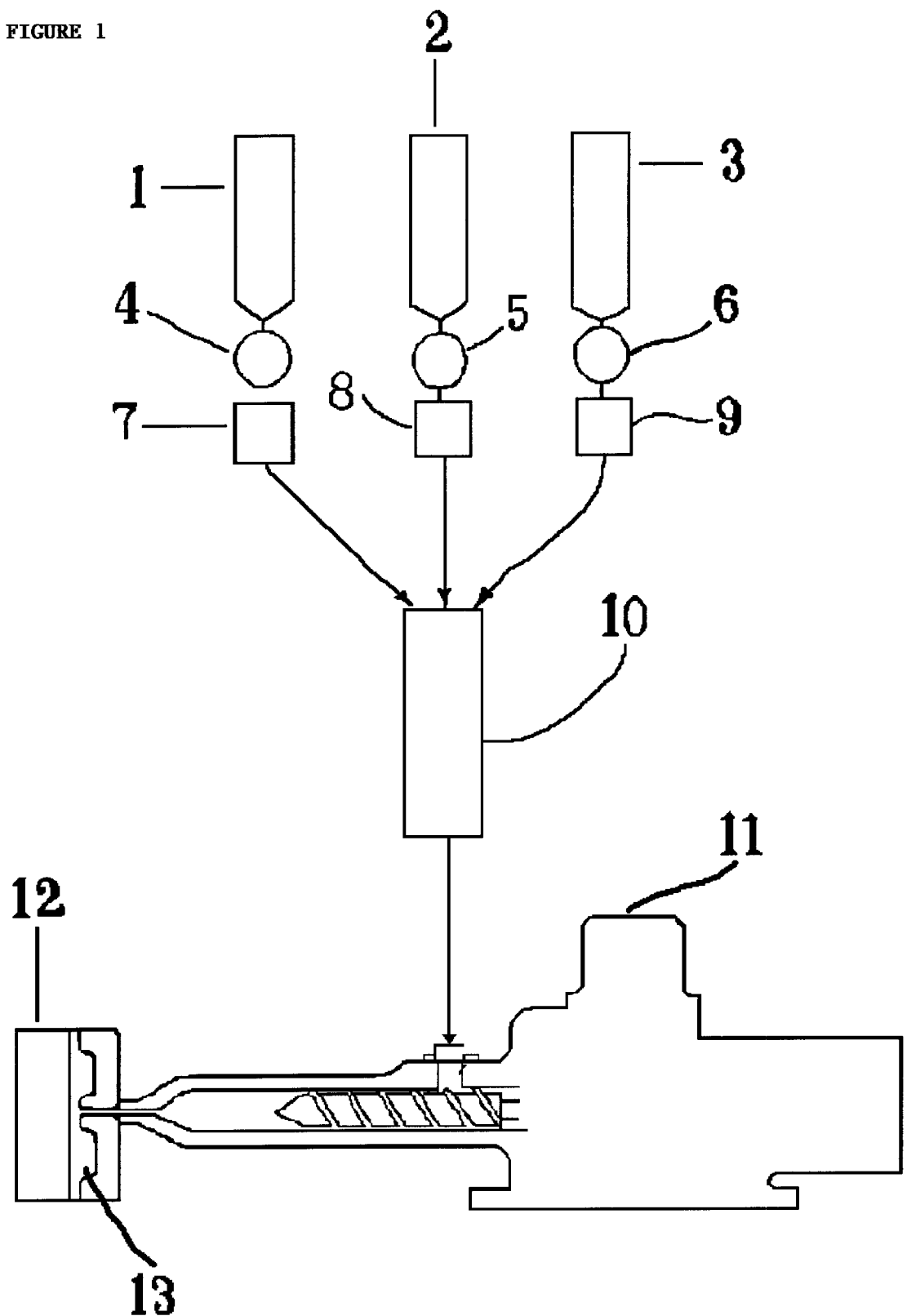
FIG. 1 is a schematic representation of an example of the present method for producing a molded silicone rubber product. (Key to FIG. 1)
1: primary composition storage tank
2: catalyst composition storage tank
3: curing agent composition storage tank
4: primary composition feed pump
5: catalyst composition feed pump
6: curing agent composition feed pump
7: primary composition feed rate adjuster
8: catalyst composition feed rate adjuster
9: curing rate composition feed rate adjuster
10: mixer
11: injection molder
12: sheet-forming mold
13: cavity of sheet-forming mold

The present invention is a method for producing a molded silicone rubber product comprising (i) forming a mixture comprising
  (A) a primary composition in the form of a paste comprising an inorganic filler and a diorganopolysiloxane containing at least 2 silicon atom-bonded alkenyl groups per molecule,
  (B) a liquid catalyst composition comprising a platinum catalyst and an organopolysiloxane containing at least 2 silicon atom-bonded alkenyl groups per molecule, and
  (C) a liquid curing composition comprising an organopolysiloxane having at least 2 silicon atom-bonded hydrogen atoms per molecule and an organopolysiloxane having at least 2 silicon atom-bonded alkenyl groups per molecule;
(ii) feeding the mixture comprising components (A), (B), and (C) into a molding device, and
(iii) curing the mixture comprising components (A), (B), and (C) by heating.

The diorganopolysiloxane containing at least 2 silicon atom-bonded alkenyl groups per molecule comprising a constituent of component (A) is a primary component by which the composition of the present invention is cross-linked into a silicone rubber. Examples of diorganopolysiloxanes include those represented by the average unit formula:

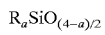

$$R_a SiO_{(4-a)/2}$$

where R is an alkyl group such as methyl, ethyl, propyl, butyl, pentyl, and hexyl; alkenyl groups such as vinyl, allyl, propenyl, and hexenyl; monovalent hydrocarbons represented by aryl groups such as phenyl or tolyl; and halogen atom-substituted monovalent hydrocarbon groups such as 3,3,3-trifluoropropyl and 3-trichloropropyl; and a is 1.8 to 2.2. Such diorganopolysiloxanes usually have a viscosity ranging from 100 to 1,000,000 mPa·s.

The molecular structure of this diorganopolysiloxane of component (A) is substantially linear, but a portion of the molecular chain may be branched. Examples of such diorganopolysiloxanes include dimethylpolysiloxanes that are end-blocked with dimethylvinylsiloxy groups; copolymers of dimethylsiloxane and methylvinylsiloxane that are end-blocked with dimethylvinylsiloxy groups; copolymers of dimethylsiloxane and methylphenylsiloxane that are end-blocked with dimethylvinylsiloxy groups; copolymers of dimethylsiloxane, methylvinylsiloxane, and methylphenylsiloxane that are end-blocked with dimethylvinylsiloxy groups; copolymers of dimethylsiloxane and diphenylsiloxane that are end-blocked with dimethylvinylsiloxy groups; copolymers of dimethylsiloxane, methylvinylsiloxane, and diphenylsiloxane that are end-blocked with dimethylvinylsiloxy groups; copolymers of dimethylsiloxane and methyl (3,3,3-trifluoropropyl)siloxane that are end-blocked with dimethylvinylsiloxy groups; and copolymers of dimethylsiloxane, methylvinylsiloxane, and methyl(3,3,3-trifluoropropyl)siloxane that are end-blocked with dimethylvinylsiloxy groups.

Examples of inorganic fillers as a constituent of component (A) include reinforcing inorganic fillers such as carbon black, fumed silica, precipitated silica and similar fine powdered silica, and colloidal calcium carbonate; non-reinforcing inorganic fillers such as powdered quartz, diatomaceous earth, aluminum oxide, aluminum hydroxide, aluminum silicate, heavy calcium carbonate, zinc oxide, magnesium oxide, magnesium hydroxide, and calcium oxide; such inorganic fillers (except for calcium carbonate) that have been surface treated with organic silicon compounds such as organochlorosilane, organoalkoxysilane, and hexaorganodisilaaane; and calcium carbonate which has been surface treated with a fatty acid. Carbon black, fine silica powder, and powdered quartz are preferred. Carbon black is a component which is used to provide the composition of the present invention with conductivity, and conventionally used agents for providing silicone rubber with conductivity can also be used. Examples of such carbon blacks include acetylene black, Ketjen Black, furnace black, thermal black, and channel black.

The platinum catalyst in the catalyst composition constituting component (B) is a catalyst for promoting the addition reaction between the diorganopolysiloxane with at least 2 silicon atom-bonded alkenyl groups per molecule of component (A) and the organopolysiloxane with at least 2 silicon atom-bonded hydrogen atoms per molecule of component (C). Examples of such platinum catalysts include finely divided platinum metal, platinum black, chloroplatinic acid, alcohol-modified chloroplatinic acid, chloroplatinic acid/olefin complexes, chloroplatinic acid/diketone complexes, and chloroplatinic acid/divinyltetramethyldisiloxane complexes, as well as thermoplastic resin powders comprising such platinum catalysts.

The diorganopolysiloxane with at least 2 silicon atom-bonded alkenyl groups per molecule of component (B) is used to dilute the platinum catalyst or to adjust the viscosity. Examples of such diorganopolysiloxanes include the same ones used in component (A) above.

The organopolysiloxane with at least 2 silicon atom-bonded hydrogen atoms per molecule of component (C) is used as a cross-linker. Examples of such organopolysiloxanes include methylhydrogenpolysiloxanes end-blocked at both terminals with trimethylsiloxy groups; dimethylsiloxane-methylhydrogensiloxane copolymers end-blocked at both terminals with trimethylsiloxy groups; dimethylsiloxane-methylhydrogensiloxane copolymers end-blocked at both terminals with dimethylhydrogensiloxy groups; and tetramethyltetrahydrogencyclosiloxane. The diorganopolysiloxane with at least 2 silicon atom-bonded alkenyl groups of component (C) is used to adjust the viscosity or dilute the organo(hydrido)polysiloxane with at least 2 silicon atom-bonded hydrogen atoms per molecule. Examples of diorganopolysiloxanes include the same ones used in component (A) above.

Components (A), (B), and (C) can also be blended as needed with curing inhibitors to adjust the curing rate. Such inhibitors include alkyne alcohols such as 3-methyl-1-buten-3-ol, 3,5-dimethyl-1-hexyn-3-ol, 1-ethinyl-1-cyclohexanol, phenylbutynol; -enine compounds such as 3-methyl-3-penten-1-ine and 3,5-dimethyl-3-hexen-1-ine; vinyl group-containing organosiloxane oligomers such as 1,3,5,7-tetramethyl-1,3,5,7-tetravinylcyclotetrasiloxane and 1,3,5,7-tetramethyl- 1,3,5,7-tetrahexenylcyclotetrasiloxane; and nitrogenous compounds such as benzotriazole and tetramethylethylenediamine, as well as mixtures thereof. These are preferably blended in amounts ranging from 0.001 to 5 weight parts per 100 weight parts component (A). Various common additives, such as silicone oil, heat resistance agents, flame retardants, pigments, and colorants can also be blended in the silicone rubber composition as needed.

Components (A), (B), and (C) used in the present invention can be readily prepared using a mixer such as a kneader mixer, pressure kneader mixer, Henschel mixer, or Ross mixer.

In the present method for producing a molded silicone rubber product, the aforementioned components (A), (B), and (C) are separately stored and the 3 components are mixed to produce a silicone rubber-forming composition when manufacturing a molded silicone rubber product.

Component (B) is preferably added to the present method in a proportion of 1 to 100 weight parts per 100 weight parts component (A), and component (C) is preferably added in a proportion of 1 to 100 weight parts per 100 weight parts component (A). Component (B) is preferably added to the present method in an amount resulting in a platinum catalyst content of 0.1 to 500 ppm (weight as elemental platinum) in the silicone rubber-forming composition comprising components (A), (B), and (C). Component (C) is preferably added to the present method in an amount resulting in a ratio of 0.3:1 to 10:1 between the number of moles of the silicon atom-bonded hydrogen atoms in this component and the number of moles of silicon atom-bonded alkenyl groups in the silicone rubber-forming composition comprising components (A), (B), and (C).

The method for producing the molded silicone rubber product in the present invention is described below with reference to FIG. 1.

In FIG. 1, the primary composition storage tank 1 is connected to a mixing device 10 by a primary composition feed pump 4 and primary composition feed rate adjuster 7. Similarly, the catalyst composition storage tank 2 is connected to the mixer 10 by a catalyst composition feed pump 5 and catalyst composition feed rate adjuster 8. The curing agent composition storage tank 3 is also connected to the mixer 10 by a curing agent composition feed pump 6 and curing agent composition feed rate adjuster 9. The primary composition of component (A) is stored in the primary composition storage tank 1 and is fed by the primary composition feed pump 4 through the primary composition feed rate adjuster 7 to the mixer 10. Similarly, the catalyst composition of component (B) is stored in the catalyst composition storage tank 2 and is fed by the catalyst composition feed pump 5 through the catalyst composition feed rate adjuster 8 to the mixer 10. The curing agent composition of component (C) is also stored in the curing agent composition storage tank 3 and is fed by the curing agent composition feed pump 6 through the curing agent composition feed rate adjuster 9 to the mixer 10. Components (A), (B), and (C) are mixed to homogeneity in the mixer 10 and are fed through a nozzle (not shown in figure) at the end of the mixer into a molding machine 11. The material is fed into cavity 13 of a preheated sheet-forming mold 12, and is heated and cured there. The proportion in which components (A) through (C) are mixed is adjusted as needed by the feed rate adjusters 7, 8, and 9.

Examples of the aforementioned mixer 10 include dynamic mixers such as single-screw continuous kneading extruders and twin-screw continuous kneading extruders, and static mixers. Examples of molding machines 11 include injection molders, compression molders, extrusion molders, transfer molders, and casting molders. The temperature at which the silicone rubber-forming composition is cured in the mold 12 ordinarily ranges from 60 to 250° C., and preferably 80 to 220° C. The curing time is usually 5 seconds to 1 hour.

The method of the present invention prolongs the time for which silicone rubber-forming compositions can be used, and provides better handling properties. It also allows the curing rate of the silicon rubber-forming composition and the hardness of the cured silicone rubber to be readily adjusted by modifying the ratio in which the three liquids of components (A) through (C) are blended.

The method of the present invention is thus suitable for the more productive manufacture of molded silicone rubber products requiring a diverse range of hardness, such as coverings for electronic copier rolls, key pads, gaskets, and packing.

EXAMPLES

The present invention is described in greater detail below through examples and comparative examples. Parts in the examples are based on weight. The viscosity was determined at 25° C. The curing rate of the silicone rubber-forming composition and the hardness of the silicone rubber sheets were determined in the following manner.

Curing Rate of Silicone Rubber-forming Composition

The induction time at 130° C. was determined using a JSR Curastometer III. That is, the silicone rubber-forming composition was poured into the Curastometer (JSR Curastometer III), and the time (seconds) was monitored until the torque reached 90% when heated to 130° C.

Hardness of Silicone Rubber Sheet

This was determined using the type A hardness meter stipulated in JIS K 6249.

Example 1

Preparation of Primary Composition

100 Parts dimethylsiloxane end-blocked at both terminals with dimethylvinylsiloxy groups (vinyl group content 0.14 wt %) having a viscosity of 10,000 mPa·s and 34 parts wet silica having a BET specific area of 200 m²/g were mixed to homogeneity and were then heat treated in vacuo to prepare a primary composition in the form of a fluid paste.

Preparation of Catalyst Composition 2.4 Parts 1,3-divinyl-1,1,3,3-tetramethyldisiloxane complex of platinum (platinum content 0.5 wt %) were added to 100 parts dimethylsiloxane end-blocked at both terminals with dimethylvinylsiloxy groups (vinyl group content 0.14 wt %) having a viscosity of 10,000 mPa·s, and the ingredients were mixed to homogeneity, giving a liquid catalyst composition.

Preparation of Curing Agent Composition

25 Parts methylhydrogensiloxane-dimethylsiloxane copolymer represented by average molecular formula

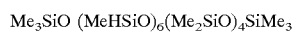

Me$_3$SiO (MeHSiO)$_6$(Me$_2$SiO)$_4$SiMe$_3$ and 0.85 part 1-ethinyl-1-cyclohexanol (as curing inhibitor) were added to 100 parts dimethylsiloxane end-blocked at both terminals with dimethylvinylsiloxy groups (vinyl group content 0.14 wt %) having a viscosity of 10,000 mPa·s, and the ingredients were mixed to homogeneity, giving a liquid curing agent composition.

The resulting primary composition, catalyst composition, and curing agent composition were separately introduced into the primary composition storage tank 1, catalyst composition storage tank 2, and curing agent composition storage tank 3, respectively, they were fed to the mixer 10 by means of feed pumps 4, 5, and 6, respectively, and adjusters 7, 8, and 9, respectively, and they were mixed to prepare a silicone rubber-forming composition (see FIG. 1). The primary composition, catalyst composition, and curing agent composition were blended in a weigh ratio of 100:5:5. The curing rate of the resulting silicone rubber was measured. The composition was then fed to a molding machine (injection molder) 11 and loaded into cavity 13 of a sheet-forming mold 12 preheated to 150° C., where the composition was allowed to stand for 7 minutes and cured under conditions involving an injection time of 20 seconds and a mold-closing pressure of 100 tons, giving a silicone rubber sheet (50 mm long, 40 mm wide, 6 mm thick). The moldability at this time and the hardness of the resulting silicone rubber sheet were determined. Silicone rubber-forming compositions were similarly formed as above except for changes in the proportions in which the primary composition, catalyst composition, and curing agent composition were blended, as given in Table 1. These were used to form silicone rubber sheets (50 mm long, 40 mm wide, 6 mm thick) in the same manner as above. To check the storage stability of the resulting primary compositions, catalyst compositions, and curing agent compositions, each of the materials was stored for 1 month at room temperature in their respective tanks. They were then used to prepare silicone rubber-forming compositions in the same manner as above, and the curing rate of the resulting compositions was determined in the same manner as above. Silicone rubber sheets 50 mm long, 40 mm wide, and 6 mm thick were also formed in the same manner as above, and the moldability at that time and the hardness of the resulting silicone rubber sheets were determined.

TABLE 1

| | Test Number | | | | |
|---|---|---|---|---|---|
| Composition and properties | 1-1 | 1-2 | 1-3 | 1-4 | 1-5 |
| Composition | | | | | |
| Primary (part) | 100 | 100 | 100 | 100 | 100 |
| Catalyst (part) | 5 | 5 | 5 | 3 | 10 |
| Curing agent (part) | 5 | 4 | 6 | 5 | 5 |
| Properties | | | | | |
| properties of silicon rubber-forming composition just after manufacture | | | | | |
| Curing rate (sec) | 31 | 26 | 34 | 50 | 13 |
| moldability | good | good | good | good | good |
| Hardness (JIS type A) | 30 | 27 | 32 | 28 | 29 |
| Properties of silicone rubber-forming composition 1 month after manufacture | | | | | |
| Curing rate (Sec) | 32 | 27 | 36 | 53 | 13 |
| Hardness (JIS type A) | 31 | 27 | 32 | 27 | 30 |

Comparative Example 1

5 Parts catalyst composition were added to 50 parts of the primary composition prepared in Example 1 and the ingredients were mixed to homogeneity, giving a primary agent (liquid A). 5 Parts curing composition were similarly added to 50 parts primary composition and the ingredients were mixed to homogeneity giving a curing agent (liquid B). Liquid A was introduced into the primary composition storage tank 1 and liquid B was introduced into the curing agent storage tank 3. They were then pumped by feed pumps 4 and 6, respectively, through feed rate adjusters 7 and 9, respectively, into mixer 10, where they were mixed to prepare a silicone rubber-forming composition. Liquids A and liquid B were mixed in a weight ratio of 1:1. The silicone rubber-forming composition was fed to injection molder 11, injected in the cavity 13 of a sheet-forming mold 12 preheated to 150° C., and allowed to stand for 7 minutes and cured under conditions involving an injection time of 20 seconds and a mold-closing pressure of 100 tons, giving a silicone rubber sheet (50 mm long, 40 mm wide, 6 mm thick). The hardness of the resulting silicone rubber sheet was determined in the same manner as in Example 1, revealing a hardness of 30. The storage stability of liquids A and B was also checked by storing them for 1 month at room temperature inside their respective storage tanks, and by then using the compositions to produce a silicone rubber-forming composition in the same manner as above. Silicone rubber sheets were formed in the same manner as above, but suffered from inadequate hardness, preventing silicone rubber sheets from being formed.

Example 2

Preparation of Primary Composition

100 Parts dimethylsiloxane-methylvinylsiloxane copolymer end-blocked at both terminals with trimethylsiloxy groups (vinyl group content 0.12 wt %) having a viscosity of 40,000 mPa·s, 58 parts quartz powder with a mean particle diameter of 5 μm, and 23 parts furnace black with an oil absorption capacity (DBP) of 80 mg/100 g were mixed to homogeneity, giving a primary composition in the form of a fluid paste.

Preparation of Catalyst Composition 3.3 Parts 1,3-divinyl-1,1,3,3-tetramethyldisiloxane complex of platinum (platinum content 0.5 wt %) were added to 100 parts dimethylsiloxane-methylvinylsiloxane copolymer end-blocked at both terminals with trimethylsiloxy groups (vinyl group content 0.12 wt %) having a viscosity of 40,000 mPa·s, and the ingredients were mixed to homogeneity, giving a liquid catalyst composition.

Preparation of Curing Agent Composition

25 Parts methylhydrogensiloxane-dimethylsiloxane copolymer represented by average molecular formula

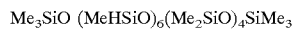

Me$_3$SiO (MeHSiO)$_6$(Me$_2$SiO)$_4$SiMe$_3$ and 1 part 1-ethinyl-1-cyclohexanol (as curing inhibitor) were added to 100 parts dimethylsiloxane-methylvinylsiloxane copolymer end-blocked at both terminals with trimethylsiloxy groups (vinyl group content 0.12 wt %) having a viscosity of 40,000 niPa·s, and the ingredients were mixed to homogeneity, giving a liquid curing agent composition.

The resulting primary composition, catalyst composition, and curing agent composition were separately introduced into primary composition storage tank 1, catalyst composition storage tank 2, and curing agent composition storage tank 3, respectively, they were fed to mixer 10 by means of feed pumps 4, 5, and 6, respectively, through adjusters 7, 8, and 9, respectively, and they were mixed to prepare a silicone rubber-forming composition. The primary composition, catalyst composition, and curing agent composition were blended in a weigh ratio of 100:10:10.

The composition was then fed to molding machine (injection molder) 11 and into cavity 13 of sheet-forming mold 12 preheated to 150° C., where the composition was allowed to stand for 7 minutes and cured under conditions involving an injection time of 20 seconds and a mold-closing pressure of 100 tons, giving a silicone rubber sheet (50 mm long, 40 mm wide, 6 mm thick). Silicone rubber-forming compositions were similarly formed as above except for changes in the proportions in which the primary composition, catalyst composition, and curing agent composition were blended, as given in Table 2. These were used to form silicone rubber sheets (50 mm long, 40 mm wide, 6 mm thick) in the same manner as above. The curing rate of the resulting silicone rubber-forming compositions was measured. To check the storage stability of the resulting primary compositions, catalyst compositions, and curing agent compositions, each of the materials was stored for 1 month at room temperature in their respective tanks. They were then used to prepare silicone rubber-forming compositions in the same manner as above, and the curing rate of the resulting compositions was determined in the same manner as above. Silicone rubber sheets 50 mm long, 40 mm wide, and 6 mm thick were also formed in the same manner as above, and the formability at that time and the hardness of the resulting silicone rubber sheets were determined. The results are given in Table 2.

TABLE 2

| Composition and properties | Test Number | | | | |
|---|---|---|---|---|---|
| | 2-1 | 2-2 | 2-3 | 2-4 | 2-5 |
| Composition | | | | | |
| Primary (part) | 100 | 100 | 100 | 100 | 100 |
| Catalyst (part) | 10 | 10 | 10 | 5 | 15 |
| Curing agent (part) | 10 | 8 | 12 | 10 | 10 |
| Properties | | | | | |
| properties of silicon rubber-forming composition just after manufacture | | | | | |
| Curing rate (sec) | 31 | 23 | 36 | 54 | 20 |
| Moldability | good | good | good | good | good |
| Hardness (JIS type A) | 40 | 37 | 42 | 38 | 41 |
| Properties of silicone rubber-forming composition 1 month after manufacture | | | | | |
| Curing rate (Sec) | 32 | 24 | 37 | 56 | 20 |
| Hardness (JIS type A) | 40 | 38 | 42 | 38 | 40 |

Comparative Example 2

10 Parts catalyst composition were added to 50 parts of the primary composition prepared in Example 2 and the ingredients were mixed to homogeneity, giving a primary agent (liquid A). 10 Parts curing composition was similarly added to 50 parts primary composition and the ingredients were mixed to homogeneity, giving a curing agent (liquid B). Liquid A was introduced into primary composition storage tank 1 and liquid B was introduced into curing agent storage tank 3. They were then pumped by feed pumps 4 and 6, respectively, through adjusters 7 and 9, respectively, into mixer 10, where they were mixed to prepare a silicone rubber-forming composition. Liquids A and liquid B were mixed in a weight ratio of 1:1. The silicone rubber-forming composition was fed to injection molder 11, injected into cavity 13 of sheet-forming mold 12 preheated to 150° C., and allowed to stand for 7 minutes and cured under conditions involving an injection time of 20 seconds and a mold-closing pressure of 100 tons, giving a silicone rubber sheet (50 mm long, 40 mm wide, 6 mm thick). The hardness of the resulting silicone rubber sheet was determined in the same manner as in Example 1, revealing a hardness of 40.

The storage stability of liquids A and B was also checked by storing them for 1 month at room temperature inside their respective storage tanks, and by then using the compositions to produce a silicone rubber-forming composition in the same manner an above. Measurement of the curing rate of the silicone rubber-forming composition and the hardness of the silicone rubber sheets revealed a curing rate of 47 seconds, and a hardness of 22.

We claim:

1. A method for producing a molded silicone rubber product comprising
    (i) forming a mixture comprising
        (A) a primary composition in the form of a paste comprising an inorganic filler and a diorganopolysiloxane containing at least 2 silicon atom-bonded alkenyl groups per molecule,
        (B) a liquid catalyst composition comprising a platinum catalyst and an organopolysiloxane containing at least 2 silicon atom-bonded alkenyl groups per molecule, and
        (C) a liquid curing composition comprising an organopolysiloxane having at least 2 silicon atom-bonded hydrogen atoms per molecule and an organopolysiloxane having at least 2 silicon atom-bonded alkenyl groups per molecule;
    (ii) feeding the mixture comprising components (A), (B), and (C) into a molding device; and
    (iii) curing the mixture comprising components (A), (B), and (C) by heating;
        wherein components (A), (B), and (C) are separately stored in a primary composition storage tank, catalyst composition storage tank, and curing agent composition storage tank, respectively; components (A), (B), and (C) are mixed by being fed to a mixing device connected to the storage tanks so as to produce a silicone rubber-forming composition; and the composition is then fed into a silicone rubber-forming device, where it is heated and cured.

2. A method for producing a molded silicone rubber product according to claim 1 where the inorganic filler of component (A) comprises carbon black.

3. A method for producing a molded silicone rubber product according to claim 2 where the content of the carbon black in the silicone rubber-forming composition is 1 to 50 weight percent.

4. A method for producing a molded silicone rubber product according to claim 1 where component (B) is added in an amount of 1 to 100 weight parts per 100 weight parts component (A), and component (C) is added in an amount of 1 to 100 weight parts per 100 weight parts component (A).

* * * * *